(No Model.)

E. LISLE.
VELOCIPEDE.

No. 476,884. Patented June 14, 1892.

Witnesses:
Herbert Blossom
F. W. Winman

Inventor:
Edward Lisle
by Henry Connett
Attorney

THE NORRIS PETERS CO., PHOTO-LITHO., WASHINGTON, D. C.

United States Patent Office.

EDWARD LISLE, OF WOLVERHAMPTON, ENGLAND.

VELOCIPEDE.

SPECIFICATION forming part of Letters Patent No. 476,884, dated June 14, 1892.

Application filed December 26, 1891. Serial No. 416,102. (No model.) Patented in England November 14, 1890, No. 18,355.

*To all whom it may concern:*

Be it known that I, EDWARD LISLE, cycle-manufacturer, a subject of the Queen of Great Britain, residing at Wolverhampton, in the county of Stafford, England, have invented certain new and useful improvements in the means of attachment between the bottom brackets and framings of cycles or velocipedes, (for which I have obtained a patent in Great Britain, No. 18,355, bearing date November 14, 1890,) of which the following is a specification.

A bottom bracket of a cycle (that is a bracket which carries the crank-axle when the power is transmitted to the driving-axle through the medium of chain or other gear) as ordinarily attached to the framing of a cycle is brazed direct to the middle tube (when such is employed) and other members of the frame, and the bearings formed therein are liable to be injured by the heat employed in brazing. Moreover, a bracket so fixed cannot be removed for packing or repair. These inconveniences have been avoided by the use of what is known as a "swing-bracket," which is connected with the framing by means of a transverse pin which passes through ears on the bracket and through a block which is brazed to the middle tube (when such is employed) and to the other members of the framing, just as the ordinary bracket is usually brazed thereto. The swing-bracket, however, being connected with the block by a transverse pin, is not found to be as rigid as is desirable, notwithstanding that an adjusting-pin for use in tightening up the chain and which acts as a diagonal stay is employed.

Now this invention has for its object simple means by which the bottom bracket may be secured with perfect rigidity to the framing and be readily detached therefrom and replaced again with the utmost facility.

The above purpose is effected, according to this invention, by brazing the end of the middle tube (when such tube is employed) and the ends of any other members which it has hitherto been usual to fix to the bracket to a block (as in the case of the block for the attachment of a swing-bracket) and fixing the bracket independently to such block by means of screw or cotter bolts or shanks formed with or rigidly fixed to the bracket and passing through holes formed to receive them in the block, such bolts or shanks being readily unscrewed or uncottered when the bracket is to be removed.

Figure 1:
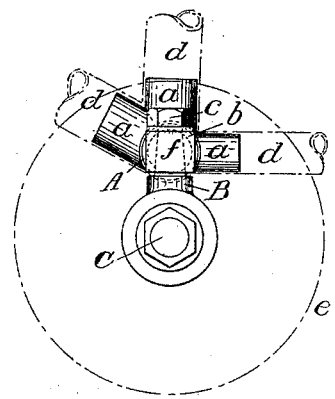
Figure 2:
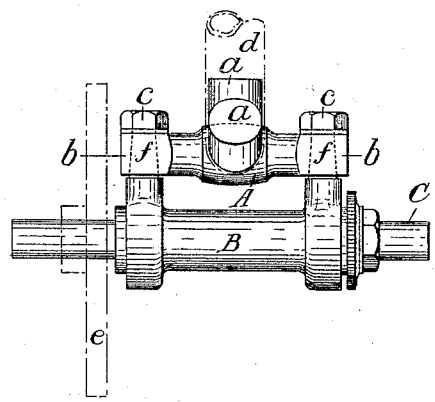
Figure 4:
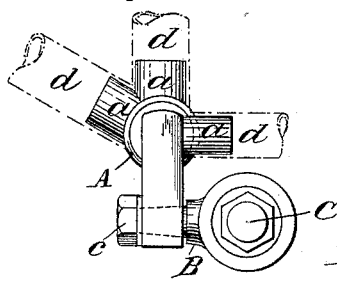
Figure 3:
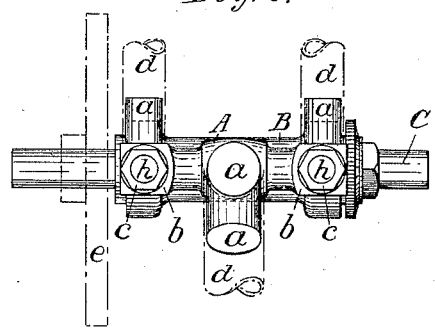
Figure 5:
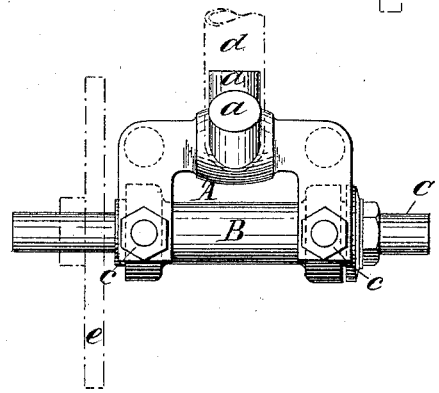

In the accompanying drawings, which serve to illustrate my invention, Figure 1 is a side elevation of the bracket and fixed block, showing the bracket secured removably to the block. Fig. 2 is a front elevation of the same. Fig. 3 is a plan of the same. Fig. 4 is a view similar to Fig. 1, illustrating a slightly-different arrangement of the parts, as will be explained hereinafter; and Fig. 5 is a front elevation of the construction seen in Fig. 4.

Like letters of reference designate like parts throughout the drawings.

In each figure the converging ends of the tubes $d$ of the framing are represented by broken lines, as is also the chain-wheel $e$, carried by the axle C. The cranks are omitted for convenience of illustration.

The block A is preferably stamped in steel and is formed with projections, shanks, or plugs $a$, as is usual with parts of like character, which are to be brazed to the tubes. These plugs enter within the ends of the respective tubes, and the block is fixed to the tubes $d$ by brazing the plugs $a$ therein. The main length of the block is transverse to the longitudinal axis of the machine, and through the ends $b$ thereof are formed taper holes $f$, as indicated by dotted lines in Figs. 1, 2, and 4. The bottom bracket B has taper shanks $h$, formed therewith, and to fix the bracket to the block A these taper shanks are pushed up into the taper holes through the respective eyes in the ends $b$ of the block A, and the bracket is securely held to the block by nuts $c$, screwed onto the ends of the shanks, which project above the block for this purpose. A perfectly-rigid connection is thus formed between the bracket B and block A, and the bracket may be readily removed by simply unscrewing the nuts $c$ and drawing the shanks out of the holes in the block.

The block A, as here shown, is employed to unite the ends of the tubes $d$ of the frame and to provide apertured branches or parts $b$ to receive the shanks $h$ on the bracket B. Usually the arrangement will be such that the axes of the tapered apertures or holes $f$ will be vertical; but I do not limit myself to this. In Figs. 4 and 5 I have shown a construction wherein the axes of these holes are horizontal. This construction is otherwise the same, as before described, the only difference being in the direction of the holes or apertures in the parts or branches *b* of the block A. This block forms, when secured to the tubes *d*, a part of the frame of the cycle.

Having thus described my invention, I claim—

1. In a cycle or velocipede, the combination, with the frame, of the elongated tubular detachable bracket B, provided with a shaft-bearing and with two shanks *h*, adapted to enter corresponding holes or apertures *f* in said frame, and means for securing said shanks rigidly but removably in place in said holes.

2. In a cycle or velocipede, the combination, with the tubes and block A, forming the frame thereof, said block having two apertures or holes *f*, of the bottom bracket B, provided with two screw-threaded shanks *h*, adapted to engage the respective holes in the block, and the nuts *c*.

3. In a cycle or velocipede, the combination, with the tubes and the block A, united rigidly together to form the frame, said block being provided with tapered holes *f*, of the bottom bracket B, provided with tapered shanks *h* to engage the respective holes in the block, and the nuts *c* on said shanks.

4. In a cycle or velocipede, the combination, with the frame comprising the tubes and the block A, secured permanently thereto and provided with vertically-arranged tapered holes *f*, of the bottom bracket B, provided with a shaft-bearing and with two tapered shanks *h*, adapted to fit into the tapered holes in the block, and nuts *c* for securing said bracket in place, substantially as set forth.

5. In a cycle or velocipede, the combination, with the frame thereof provided with a block A at its lower part, said block having a portion extending transversely of the longitudinal axis of the cycle with holes *f* therein, of the bottom bracket B, provided with shanks *h* to engage said holes in the block, and means for securing said shanks removably in said holes.

In witness whereof I have hereunto signed my name in the presence of two subscribing witnesses.

EDWARD LISLE.

Witnesses:
 CHARLES LEMESLE ADAMS,
  *Not. Pub.*
 STEPHEN WATKINS,
  *Patent Agent.*